United States Patent
Lee et al.

(10) Patent No.: US 11,294,524 B2
(45) Date of Patent: Apr. 5, 2022

(54) TOUCH SENSING DEVICE AND METHOD

(71) Applicant: SILICON WORKS CO., LTD., Daejeon (KR)

(72) Inventors: Hee Jin Lee, Daejeon (KR); Jae Hwan Lee, Daejeon (KR); Jeong Kwon Nam, Daejeon (KR); Kyu Tae Lee, Daejeon (KR); Hyun Soo Chung, Daejeon (KR); Jin Yoon Jang, Daejeon (KR); Hee Ra Yun, Daejeon (KR); Kyung Min Shin, Daejeon (KR); Mun Seok Kang, Daejeon (KR)

(73) Assignee: SILICON WORKS CO., LTD, Daejeon (KR)

( * ) Notice: Subject to any disclaimer, the term of this patent is extended or adjusted under 35 U.S.C. 154(b) by 0 days.

(21) Appl. No.: 17/122,316

(22) Filed: Dec. 15, 2020

(65) Prior Publication Data

US 2021/0191571 A1   Jun. 24, 2021

(30) Foreign Application Priority Data

Dec. 19, 2019   (KR) .................. 10-2019-0171206

(51) Int. Cl.
*G06F 3/044*   (2006.01)
*G06F 3/041*   (2006.01)

(52) U.S. Cl.
CPC ...... *G06F 3/0446* (2019.05); *G06F 3/041662* (2019.05)

(58) Field of Classification Search
CPC .......... G06F 3/042; G06F 3/043; G06F 3/044; G06F 3/0446; G06F 3/041662
USPC .................................................. 345/173, 174
See application file for complete search history.

(56) References Cited

U.S. PATENT DOCUMENTS

| | | | |
|---|---|---|---|
| 9,977,535 B2 | 5/2018 | Noguchi et al. | |
| 9,996,194 B1* | 6/2018 | Putra | G06F 3/04166 |
| 10,310,733 B2* | 6/2019 | Kim | G06F 3/041662 |
| 10,402,025 B2 | 9/2019 | Krah et al. | |
| 10,739,994 B2* | 8/2020 | Kim | G06F 3/04886 |
| 2013/0215053 A1* | 8/2013 | Lin | G06F 3/041 |
| | | | 345/173 |
| 2013/0307823 A1* | 11/2013 | Grivna | G06F 3/044 |
| | | | 345/174 |
| 2018/0366520 A1* | 12/2018 | Gwon | G06F 3/0412 |

* cited by examiner

*Primary Examiner* — Calvin C Ma
(74) *Attorney, Agent, or Firm* — Fewnick & West LLP

(57) ABSTRACT

The present disclosure provides a technology for mitigating retransmission in a low ground mass (LGM) state and improving the touch sensitivity by not driving two adjacent sensor electrodes simultaneously.

11 Claims, 7 Drawing Sheets

TOUCH SENSING DEVICE AND METHOD

CROSS REFERENCE TO RELATED APPLICATION

This application claims priority from Republic of Korea Patent Application No. 10-2019-0171206, filed on Dec. 19, 2019, which is hereby incorporated by reference in its entirety.

BACKGROUND

1. Field of Technology

The present disclosure relates to a touch sensing device.

2. Description of the Prior Art

A panel comprising a plurality of sensor electrodes, to sense a proximity or a touch of an object, is generally referred to as a touch panel.

A touch panel may be completely separated from a display panel for displaying images depending on types of panels. However, since recently, there are many cases in which a touch panel and a display panel are integrated and two panels may commonly be referred to as a panel without being distinguished. A panel described below will be considered as a panel comprising a plurality of sensor electrodes to sense the proximity or a touch of an object.

The proximity or a touch of an object to a panel may be sensed by a touch sensing device driving such a panel. The touch sensing device senses a proximity or a touch of an object to a panel by supplying a driving signal to the panel and receiving a response signal to this driving signal.

A touch sensing device may drive a panel in a self-capacitive mode or in a mutual capacitive mode. When driving a panel in the self-capacitive mode, the touch sensing device may sense a touch to the panel by receiving a response signal from an electrode to which a driving signal is supplied. When driving a panel in the mutual capacitive mode, the touch sensing device may sense a touch to the panel by supplying a driving signal to a transmitting electrode among sensing electrodes and receiving a response signal from a receiving electrode coupled with the transmitting electrode by a capacitance. The self-capacitive mode and the mutual capacitive mode are all touch sensing modes in a capacitive mode.

In a touch sensing in a capacitive mode, a ground state of an object and a panel may affect the touch sensitivity. Generally, an object may change the capacitance of a sensor electrode when it touches a panel. A touch sensing device may sense such a change of the capacitance and determine whether or not there is a touch of the object to the panel depending on the change in an amount of the capacitance. However, in a case when the panel has a weak ground, the capacitance between a sensor electrode and the object is small, and thus, the change of the capacitance of the sensor electrode is small, even when the object approaches the sensor electrode. Such a state in which a panel has a weak ground may be referred to as a low ground mass (LGM) state. A technology for improving the touch sensitivity in such an LGM state is required.

SUMMARY

An aspect of the present disclosure is to provide a technology for improving the touch sensitivity in an LGM state. Another aspect of the present disclosure is to provide a technology for mitigating a retransmission in which a driving signal, supplied to another electrode, flows in a response signal of an electrode in question as noise in an LGM state.

To this end, in an aspect, the present disclosure provides a touch sensing device, which is a device for sensing a touch to a panel, in which a plurality of transmitting (TX) electrodes and a plurality of receiving (RX) electrodes intersecting with each other are disposed, comprising: a driving circuit to drive the plurality of TX electrodes and the plurality of RX electrodes such that a response signal may be received from an electrode, to which a driving signal has been supplied; a controlling circuit to control the driving circuit to drive two adjacent TX electrodes or two adjacent RX electrodes in different times; and a transmitting circuit to transmit touch data generated according to the response signal to an external device.

The controlling circuit may drive, in a first time, TX electrodes or RX electrodes disposed in odd-numbered positions in one direction and, in a second time different from the first time, TX electrodes or RX electrodes disposed in even-numbered positions in the one direction.

The controlling circuit may divide the plurality of TX electrodes or the plurality of RX electrodes into N (N is a natural number, which is 2 or higher) groups and drive the groups in different times. Each group may comprise TX electrodes or RX electrodes having the same remainder after dividing sequence numbers of the electrodes disposed in one direction by N.

The controlling circuit may control the driving circuit to drive the TX electrodes and the RX electrode in different times.

The driving circuit may drive the plurality of RX electrodes using a plurality of channels respectively corresponding to the plurality of RX electrodes, wherein the adjacent two channels may respectively drive the RX electrodes in different times and the remaining channels, which do not drive the RX electrodes, may operate in a power saving mode.

The driving circuit may receive a response signal from an electrode, to which a driving signal has been supplied, in a self-capacitive mode, whereas it may supply a driving signal to a TX electrode an receive a response signal from an RX electrode in a mutual capacitive mode.

The controlling circuit may selectively control the driving circuit to operate in one of the self-capacitive mode and the mutual capacitive mode.

The controlling circuit may control the driving circuit to drive the two adjacent TX electrodes or the two adjacent RX electrodes in different times in the self-capacitive mode and control the driving circuit to simultaneously drive the two adjacent TX electrodes in the mutual capacitive mode.

The controlling circuit may control the driving circuit to simultaneously drive multiple non-adjacent TX electrodes or multiple non-adjacent RX electrodes.

In another aspect, the present disclosure provides a touch sensing method, which is a method of sensing a touch to a panel, in which a plurality of TX electrodes and a plurality of RX electrodes intersecting with each other are disposed, comprising: driving the RX electrodes such that a response signal is received from an electrode, to which a driving signal has been supplied, in a first time section of a self-capacitive mode, wherein adjacent two RX electrodes are driven respectively in different times; and transmitting touch data, generated according to the response signal, to an external device.

The touch sensing method may further comprise driving the TX electrodes such that a response signal is received from an electrode, to which a driving signal has been supplied, in a second time section of the self-capacitive mode, wherein adjacent two TX electrodes are driven respectively in different times.

The touch sensing method may further comprise determining a touch coordinate in one direction using a response signal for an RX electrode and a touch coordinate in another direction perpendicular to the one direction using a response signal for a TX electrode. The touch data may comprise the touch coordinate in one direction and the touch coordinate in the other direction.

The touch sensing method may further comprise simultaneously driving multiple adjacent TX electrodes in the self-capacitive mode.

The touch sensing method may further comprise supplying a driving signal to a TX electrode and receiving a response signal from an RX electrode in a mutual capacitive mode after the driving in the self-capacitive mode.

The touch sensing method may simultaneously drive multiple non-adjacent RX electrodes in the step of driving the RX electrodes.

As described above, the present disclosure allows improving the touch sensitivity in an LGM state. In particular, the present disclosure allows improving the touch sensitivity by mitigating retransmission in which a driving signal supplied to another electrode flows in a response signal of an electrode in question as noise in the LGM state.

DETAILED DESCRIPTION

Figure 1:
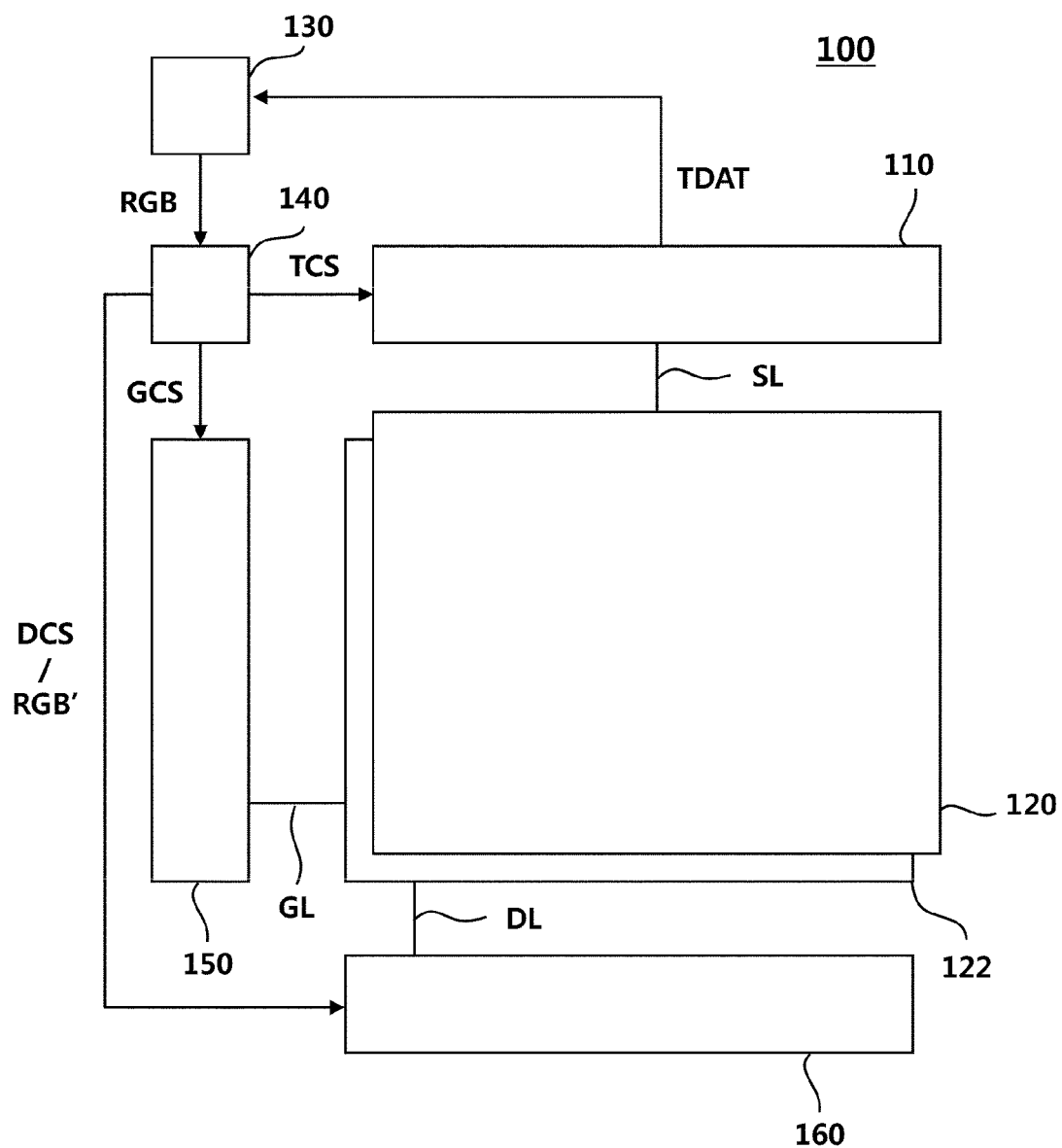
FIG. 1 is a diagram schematically illustrating a display device according to an embodiment.

FIG. 1 is a diagram schematically illustrating a display device according to an embodiment.

Referring to FIG. 1, a display device 100 may comprise a display panel 122, a touch panel 120, a data driving circuit 160, a gate driving circuit 150, a timing controlling circuit 140, a touch sensing circuit 110, and a host 130.

On the display panel 122, a plurality of data lines DL connected with the data driving circuit 160 and a plurality of gate lines GL connected with the gate driving circuit 150 may be disposed. In addition, on the display panel 122, a plurality of pixels, corresponding to points at which the plurality of data lines DL and the plurality of gate lines GL intersect with each other, may be defined.

On the touch panel 120, a plurality of sensor electrodes may be disposed to be spaced apart from each other. In an area where a sensor electrode is located, one pixel or a plurality of pixels may be disposed. A pixel may be of the liquid crystal display (LCD) type or a pixel comprising an organic light emitting diode (OLED).

The display panel 122 and the touch panel 120 may be separated from each other or comprised in an in-cell typed panel in which a display panel and a touch panel share some components.

The data driving circuit 160 supplies data signals through data lines DL in order to display digital images respectively in the pixels of the display panel 122.

The gate driving circuit 150 sequentially supplies scan signals through gate lines GL in order to turn on or turn off transistors located in the respective pixels.

The timing controlling circuit 140 supplies various control signals to the data driving circuit 160, the gate driving circuit 150, and the touch sensing circuit 110.

The timing controlling circuit 140 may output a data control signal DCS for controlling the data driving circuit 160 and a gate control signal GCS for controlling the gate driving circuit 150 based on external timing signals such as vertical/horizontal synchronization signals Vsync, Hsync, image signals RGB, clock signals, or the like inputted from the host 130. In addition, the timing controlling circuit 140 may convert an image signal RGB inputted from the host 130 into a data signal in a form used in the data driving circuit 160 and supply a converted image signal RGB' to the data driving circuit 160. As an example, the timing controlling circuit 140 may convert an image signal RGB according to the resolution or the structure of the pixels of the display panel 122 and supply a converted image signal RGB' to the data driving circuit 160.

In response to a data control signal DCS and the converted image signal RGB' inputted from the timing controlling circuit 140, the data driving circuit 160 may convert the converted image signal RGB' into an analog pixel signal (data signal or data voltage), which is a voltage value corresponding to a greyscale value, and supply it to a data line DL. The gate driving circuit 150 may sequentially supply scan signals to gate lines GL in response to a gate control signal GCS inputted from the timing controlling circuit 140.

The timing controlling circuit 140 may transmit a touch control signal TCS, for controlling timings of the touch sensing circuit 110, to the touch sensing circuit 110.

The touch sensing circuit 110 may supply a driving signal to the whole or some of the plurality of sensor electrodes respectively connected with the sensing lines SL according to the touch control signal TCS and receive a response signal to the driving signal to generate touch data TDAT, and then, transmit the touch data TDAT to the host 130.

A touch sensing circuit 110 may be disposed outside a data driving circuit 160 and a gate driving circuit 150 as a component separated from the data driving circuit 160 and the gate driving circuit 150 as shown in FIG. 1. However, depending on implementation methods, it may also be implemented as an internal component of a driver integrated circuit comprising at least one of a data driving circuit 160 and a gate driving circuit 150, or may be implemented as an internal component of a data driving circuit 160 or a gate driving circuit 150.

Accordingly, an action that the touch sensing circuit 110 supplies a driving signal to the whole or some of the plurality of sensor electrodes may be considered as an action that a driver integrated circuit comprising the touch sensing circuit 110 supplies a driving signal to the whole or some of the plurality of sensor electrodes, or, depending on designing methods, as an action that the data driving circuit 160 or the gate driving circuit 150 comprising the touch sensing circuit 110 supplies a driving signal to the whole or some of the plurality of sensor electrodes.

As described above, a touch sensing circuit 110 may be an independent component or an internal component disposed inside or outside another component without being restricted by an implementation or designing method as long as it performs the same function as that described in the present specification.

In addition, even though the display device 100 comprises one touch sensing circuit 110 in FIG. 1, a display device 100 may comprise two or more touch sensing circuits 110.

In order for a touch sensing circuit 110 to supply driving signals to the whole or some of the plurality of sensor electrodes, sensing lines SL respectively connected with the plurality of sensor electrodes, are required. Accordingly, sensing lines SL, respectively connected with the plurality of sensor electrodes and transmitting driving signals, may be disposed on the panel 120 in a first direction (for example: a longitudinal direction) or in a second direction (for example: a transversal direction).

The display device 100 may adopt a capacitive mode in which the proximity or a touch of an object is sensed by detecting a change of capacitance by sensor electrodes.

The capacitive mode may be divided, for example, into a mutual capacitive mode and a self-capacitive mode.

According to the mutual capacitive mode, which is a type of the capacitive mode, a driving signal is supplied to one sensor electrode (a transmitting (TX) electrode) and another sensor electrode (receiving (RX) electrode) mutually coupled with this TX electrode is sensed. In the mutual capacitive mode, values sensed in an RX electrode vary depending on the proximity or a touch of a finger, a pen, or the like, and a touch or coordinates for a touch may be detected using such values sensed in an RX electrode.

According to the self-capacitive mode, which is another type of capacitive mode, a driving signal is supplied to one sensor electrode and this sensor electrode is sensed. In the self-capacitive mode, values sensed in a TX electrode vary depending on the proximity or a touch of a finger, a pen, or the like, and a touch or coordinates for a touch may be detected using such sensed values. In the self-capacitive mode, a sensor electrode to which a driving signal is supplied is the same as a sensor electrode to be sensed. That is, there is no distinction between a TX electrode and an RX electrode.

The display device 100 may adopt both types of the capacitive mode (the mutual capacitive mode and the self-capacitive mode). The display device 100 may distinguish one mode from another to sense a touch to a touch panel in the mutual capacitive mode when the mode is the mutual capacitive one and to sense a touch to a touch panel in the self-capacitive mode when the mode is the self-capacitive one.

Figure 2:
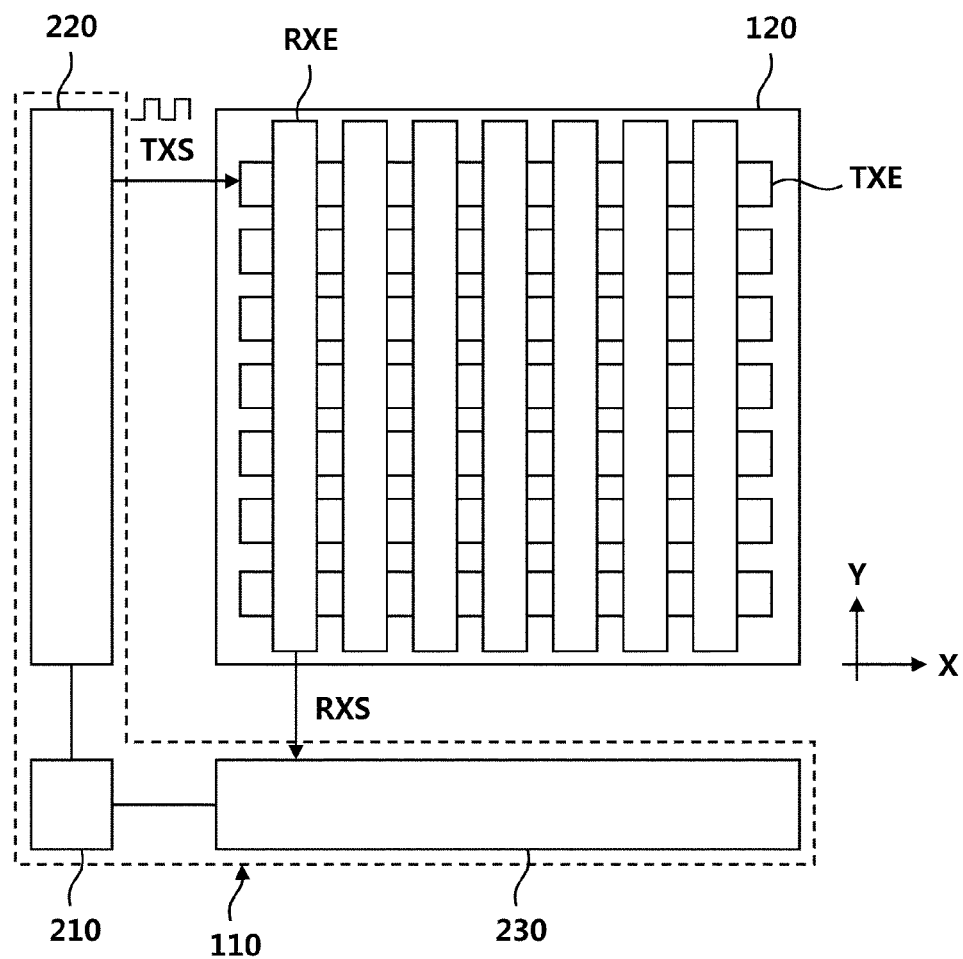
FIG. 2 is a diagram illustrating that a touch sensing circuit according to an embodiment operates in a mutual capacitive mode.

FIG. 2 is a diagram illustrating that a touch sensing circuit according to an embodiment operates in a mutual capacitive mode.

Referring to FIG. 2, on the touch panel 120, a plurality of TX electrodes TXE and a plurality of RX electrodes RXE intersecting with each other may be disposed. The plurality of TX electrodes TXE may be disposed such that their longitudinal direction is set as a first direction X and they are spaced from each other in a second direction Y. The plurality of RX electrodes RXE may be disposed such that their longitudinal direction is set as the second direction Y and they are spaced from each other in the first direction X. Here, the first direction X and the second direction Y may be perpendicular to each other.

The plurality of TX electrodes TXE and the plurality of RX electrodes RXE may be coupled with each other by capacitances. Such coupling allows signals in an AC waveform, supplied to a TX electrode TXE, to be transferred to an RX electrode RXE.

The touch sensing circuit 110 may comprise a first driving circuit 220, a second driving circuit 230, and a controlling circuit 210.

The first driving circuit 220 may supply driving signals TXS to the plurality of TX electrodes TXE in the mutual capacitive mode. The first driving circuit 220 may sequentially supply the driving signals TXS to the TX electrodes TXE in the second direction.

The second driving circuit 230 may receive response signals RXS from the plurality of RX electrodes RXE in the mutual capacitive mode. The second driving circuit 230 may convert a response signal RXS into digital data and the controlling circuit 210 may generate touch data including touch coordinates using the digital data. The controlling circuit 210 may transmit the touch data to an external device (for example, a host (see 130 in FIG. 1)). Touch coordinates may comprise a coordinate in the first direction X and a coordinate in the second direction Y.

The first driving circuit 220 may comprise a plurality of TX channels respectively connected with the plurality of TX electrodes TXE. The first driving circuit 220 may sequentially operate the plurality of TX channels to sequentially transmit driving signals to the plurality of TX electrodes TXE.

The second driving circuit 230 may comprise a plurality of RX channels respectively connected with the plurality of RX electrodes RXE. The second driving circuit 230 may simultaneously operate the plurality of RX channels and convert response signals RXS, respectively received through the plurality of RX channels, into digital data.

The plurality of TX channels may function as RX channels receiving response signals and converting them into digital data. The plurality of RX channels may function as TX channels transmitting driving signals. Such multiple functions of each channel allow the touch sensing circuit 110 to operate in the mutual capacitive mode as well as in the self-capacitive mode.

Figure 3:
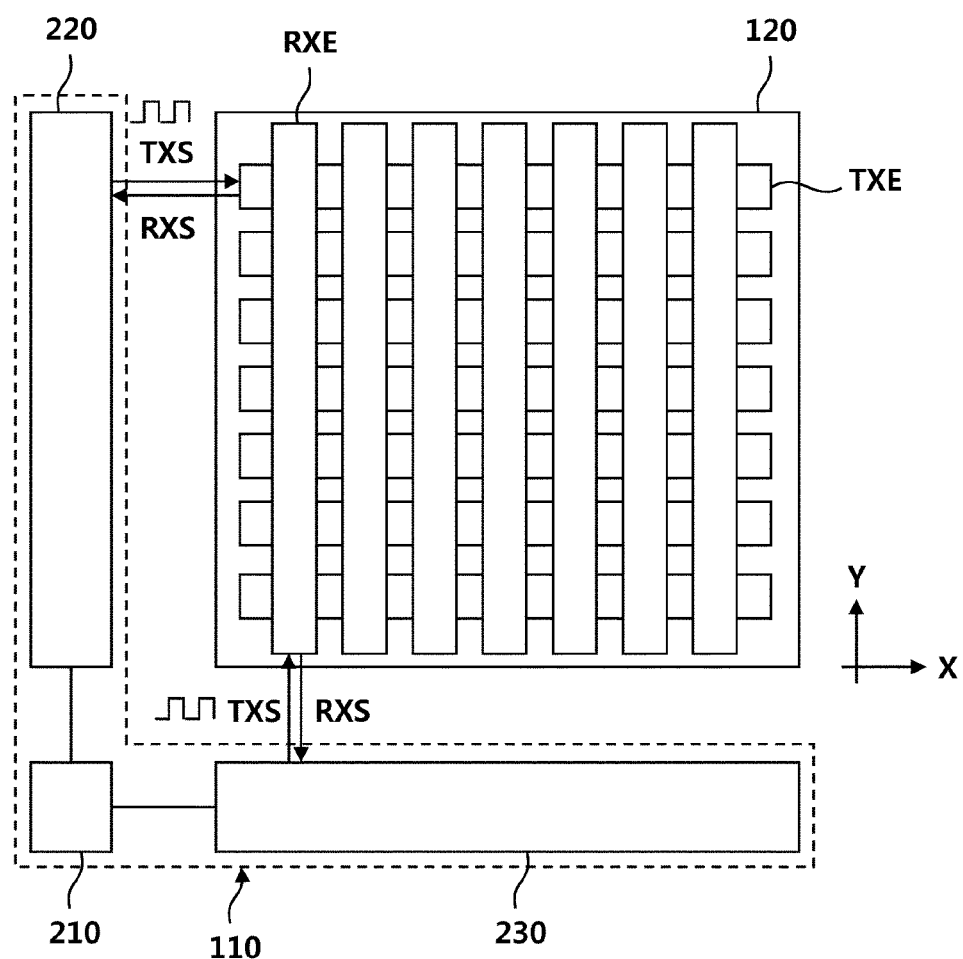
FIG. 3 is a diagram illustrating that a touch sensing circuit according to an embodiment operates in a self-capacitive mode.

FIG. 3 is a diagram illustrating that a touch sensing circuit according to an embodiment operates in a self-capacitive mode.

The touch sensing circuit 110 may change its operation mode as necessary while operating. For example, the touch sensing circuit 110 may operate in the self-capacitive mode, and then, change its mode to operate in the mutual capacitive mode, or operate in the mutual capacitive mode, and then, change its mode to operate in the self-capacitive mode. The touch sensing circuit 110 may operate in the self-capacitive mode in a case when the display device is in a power saving mode, and then, when a touch is perceived in the self-capacitive mode, the touch sensing circuit 110 may change its mode to operate in the mutual capacitive mode.

In the self-capacitive mode, the first driving circuit 220 may supply a driving signal TXS to a TX electrode TXE and receive a response signal RXS from the TX electrode TXE to generate digital data for the response signal RXS. The controlling circuit 210 may calculate a coordinate in the second direction Y of touch coordinates using the digital data generated by the first driving circuit 220.

In the self-capacitive mode, the second driving circuit 220 may supply a driving signal TXS to an RX electrode RXE and receive a response signal from the RX electrode RXE to generate digital data for the response signal RXS. The controlling circuit 210 may calculate a coordinate in the first direction X of touch coordinates using the digital data generated by the second driving circuit 230.

Meanwhile, when the touch panel is in an LGM state (for example, when a user does not hold the display device in the user's hand), a driving signal supplied to another electrode may flow in a response signal of an electrode in question as noise, and this may lower the touch sensitivity.

Figure 4:
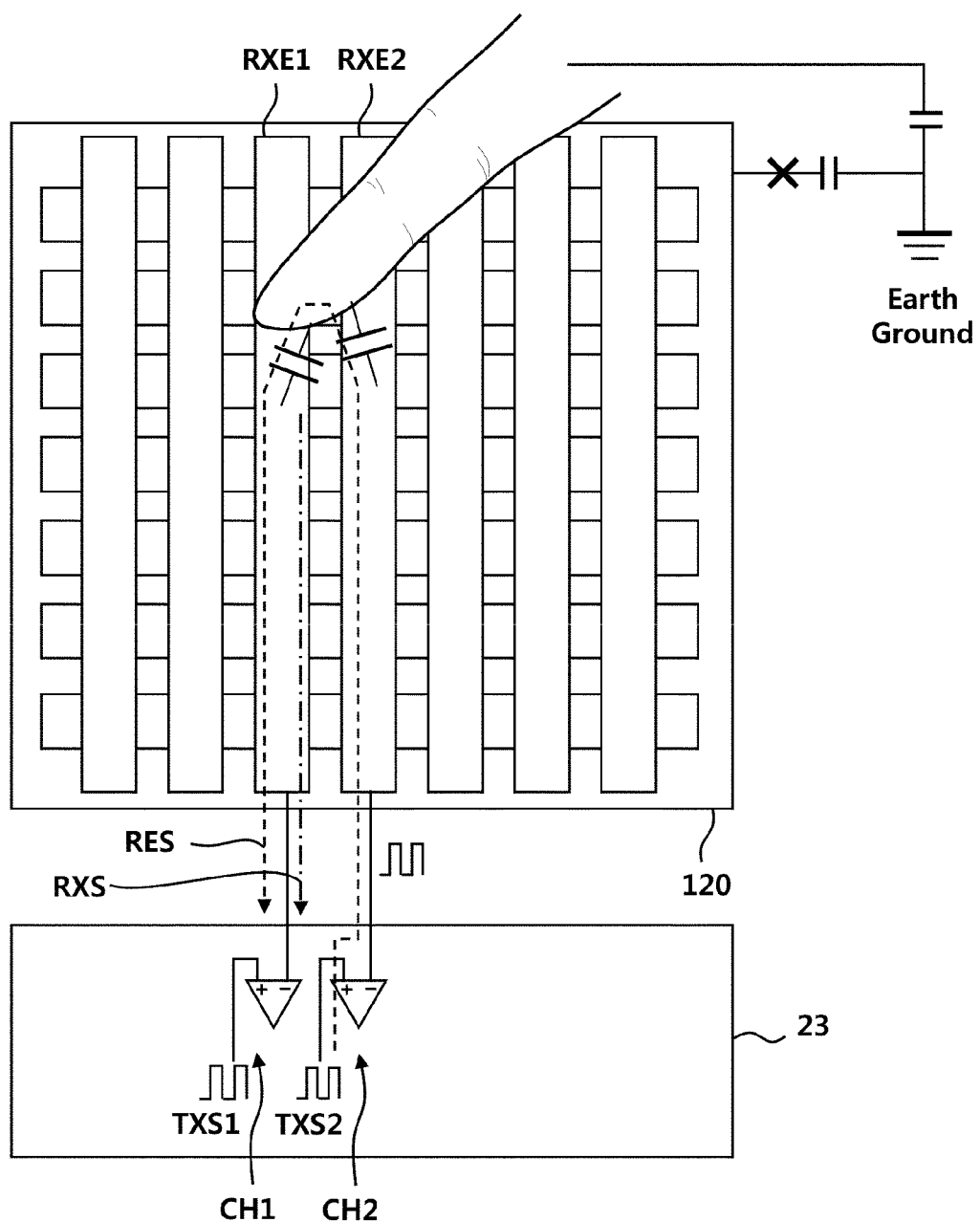
FIG. 4 is a diagram illustrating that a driving signal, supplied to another electrode, flows in a response signal of an electrode in question as noise according to an embodiment.

FIG. 4 is a diagram illustrating that a driving signal, supplied to another electrode, flows in a response signal of an electrode in question as a noise.

Referring to FIG. 4, a driving circuit 23 simultaneously supplies driving signals TXS1, TXS2 to adjacent two sensor electrodes RXE1, RXE2 using two channels CH1, CH2.

Here, the touch panel 120 may be in an LGM state, in which the touch panel is not in ground connection. In this case, no current path is formed among an object, a ground, and the touch panel 120. Accordingly, a second driving signal TXS2 supplied to a second sensor electrode RXE2 may flow in a first sensor electrode RXE1 through a capacitance formed among the two sensor electrodes RXE1, RXE2 and the object. Supposing that a signal formed in the first sensor electrode RXE1 by the second driving signal TXS2 is referred to as a retransmission signal RES, a response signal RXS by the first driving signal TXS1 as well as a retransmission signal RES are formed in the first sensor electrode RXE1.

In this case, a first channel CH1 may perceive the retransmission signal RES as noise and this may cause lowering the touch sensitivity.

In order to reduce the influence of such a retransmission signal and improve the touch sensitivity, the touch sensing circuit according to an embodiment may drive adjacent two sensor electrodes in different times.

Figure 5:
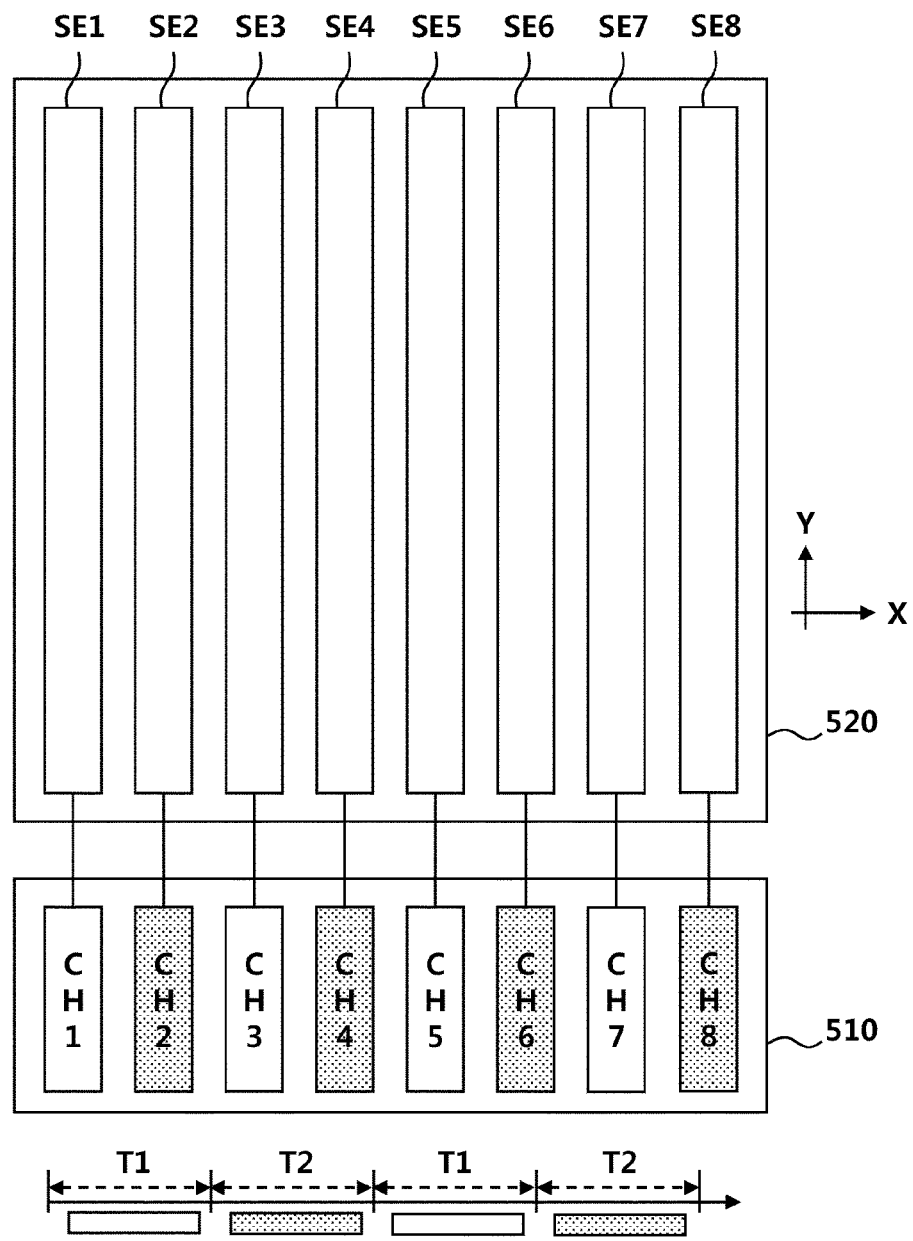
FIG. 5 is a diagram illustrating a first exemplary method of driving sensor electrodes by a driving circuit of a touch sensing circuit.

FIG. 5 is a diagram illustrating a first exemplary method of driving sensor electrodes by a driving circuit of a touch sensing circuit.

Referring to FIG. 5, a driving circuit 510 may comprise a plurality of channels CH1-CH8. On a panel 520, a plurality of sensor electrodes SE1-SE8 may be disposed. The driving circuit 510 may be the first driving circuit 220 or the second driving circuit 230 described above referring to FIG. 1 to FIG. 3. Or, the driving circuit 510 may be a device comprising the first driving circuit 220 and the second driving circuit 230 described above referring to FIG. 1 to FIG. 3. The panel 520 may be the same as the touch panel 120 described above referring to FIG. 1 to FIG. 3 and the plurality of sensor electrodes SE1-SE8 may be the plurality of RX electrodes or the plurality of TX electrodes of the touch panel 120 described above referring to FIG. 1 to FIG. 3.

The respective channels CH1-CH8 may be connected with the respective sensor electrodes SE1-SE8. Each of the channels CH1-CH8 may supply a driving signal to each of the sensor electrodes SE1-SE8 and receive a response signal from a sensor electrode to which the channel supplies the driving signal.

The driving circuit 510 may drive adjacent two of the sensor electrodes SE1-SE8 in different times. Such a drive allows each of the sensor electrodes SE1-SE8 not to be driven simultaneously with adjacent sensor electrodes.

The driving circuit 510 may drive sensor electrodes SE1, SE3, SE5, SE7 disposed in odd-numbered positions in a direction X in a first time T1 and sensor electrodes SE2, SE4, SE6, SE8 disposed in even-numbered positions in the direction X in a second time T2.

Each of the channels CH1-CH8 may not be provided with driving power or be driven in a power saving mode during a non-driven time. For example, channels CH1, CH3, CH5, CH7, connected with the sensor electrodes SE1, SE3, SE5, SE7 disposed in the odd-numbered positions, may not be provided with driving power or be driven in a power saving mode in the second time T2, whereas channels CH2, CH4, CH6, CH8, connected with the sensor electrodes SE2, SE4, SE6, SE8 disposed in the even-numbered positions, may not be provided with driving power or be driven in a power saving mode in the first time T1.

Figure 6:
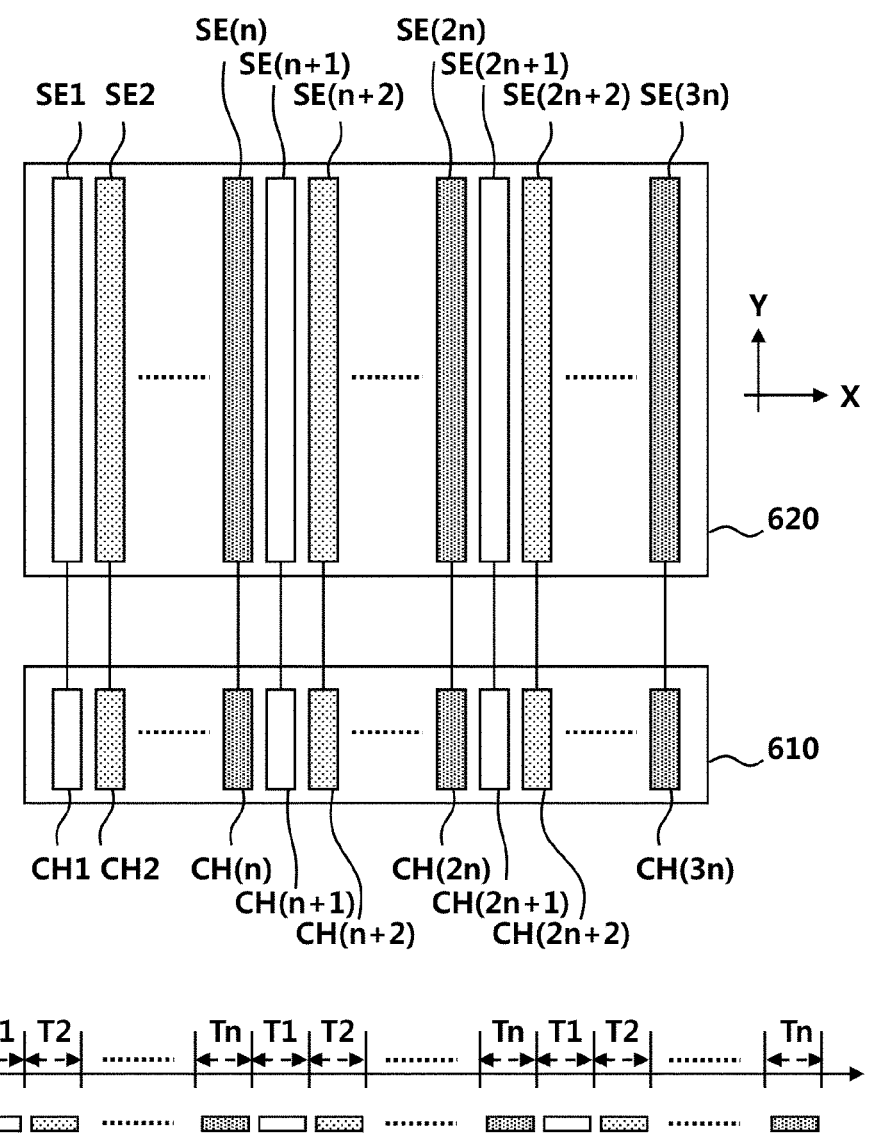
FIG. 6 is a diagram illustrating a second exemplary method of driving sensor electrodes by a driving circuit of a touch sensing circuit.

FIG. 6 is a diagram illustrating a second exemplary method of driving sensor electrodes by a driving circuit of a touch sensing circuit.

Referring to FIG. 6, a driving circuit 610 may comprise a plurality of channels CH1-CH(3n). On a panel 620, a plurality of sensor electrodes SE1-SE(3n) may be disposed. The driving circuit 610 may be the first driving circuit 220 or the second driving circuit 230 described above referring to FIG. 1 to FIG. 3. Or, the driving circuit 610 may be a device comprising the first driving circuit 220 and the second driving circuit 230 described above referring to FIG. 1 to FIG. 3. The panel 620 may be the same as the touch panel 120 described above referring to FIG. 1 to FIG. 3 and the plurality of sensor electrodes SE1-SE(3n) may be the plurality of RX electrodes or the plurality of TX electrodes of the touch panel 120 described above referring to FIG. 1 to FIG. 3.

The respective channels CH1-CH(3n) may be connected with the respective sensor electrodes SE1-SE(3n). Each of the channels CH1-CH(3n) may supply a driving signal to each of the sensor electrodes SE1-SE(3n) and receive a response signal from a sensor electrode to which the channel supplies the driving signal.

The driving circuit 610 may drive two adjacent sensor electrodes among the sensor electrodes SE1-SE(3n) in different times. Such a drive allows each of the sensor electrodes SE1-SE(3n) not to be driven simultaneously with adjacent sensor electrodes.

The driving circuit 610 may divide the plurality of sensor electrodes SE1-SE(3n) into N (N is a natural number, which is 2 or higher) groups in one direction X and drives the groups in different times. Each group may comprise sensor electrodes SE1-SE(3n) having the same remainder after dividing sequence numbers of the electrodes disposed in the one direction X by N.

For example, the driving circuit 610 may drive sensor electrodes SE1, SE(n+1), SE(2n+1) of a first group in a first time T1, sensor electrodes SE2, SE(n+2), SE(2n+2) of a second group in a second time T2, and sensor electrodes SE(n), SE(2n), SE(3n) of a Nth group in a Nth time Tn.

In addition, the driving circuit 610 may drive ones of the channels CH1-CH(3n), which do not supply driving signals, in a power saving mode or may not supply driving power to these channels.

Figure 7:
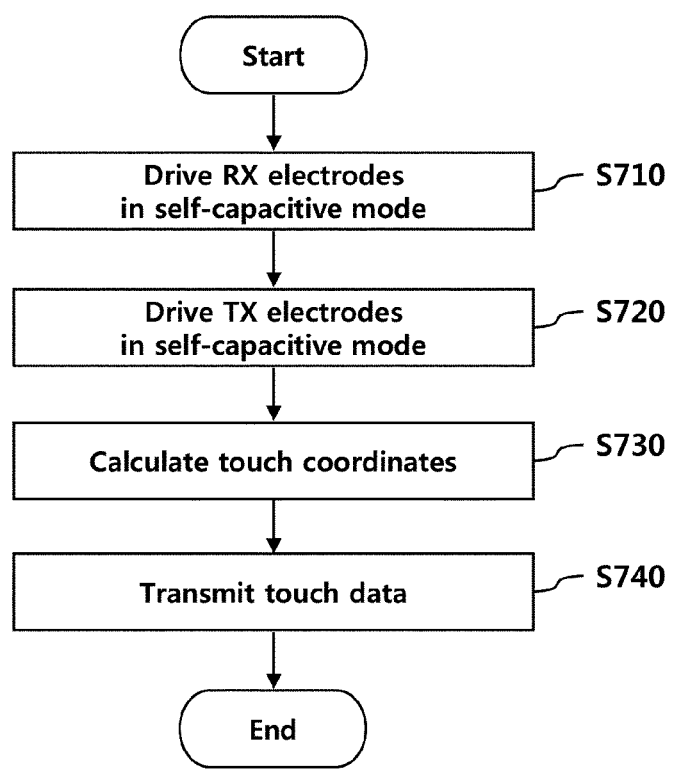
FIG. 7 is a flow diagram of a touch sensing method according to an embodiment.

FIG. 7 is a flow diagram of a touch sensing method according to an embodiment.

Referring to FIG. 7, a touch sensing circuit may drive RX electrodes such that a response signal is received from an RX electrode, to which a driving signal has been supplied, in a first time section of a self-capacitive mode and adjacent two RX electrodes are driven in different time (S710).

In addition, the touch sensing circuit may drive TX electrodes such that a response signal is received from a TX electrode, to which a driving signal has been supplied, in a second time section of a self-capacitive mode and adjacent two TX electrodes are driven in different time (S720).

The touch sensing circuit may determine a touch coordinate in one direction using the response signal for the RX electrode and a touch coordinate in another direction, perpendicular to the one direction, using the response signal for the TX electrode (S730).

The touch sensing circuit may transmit, to an external device, touch data including the touch coordinate in the one direction and the touch coordinate in the other direction (S740).

The touch sensing circuit may change its mode into a mutual capacitive mode, supply a driving signal to a TX electrode, and receive a response signal from an RX electrode.

What is claimed is:

1. A touch sensing device, which is a device for sensing a touch to a panel in which a plurality of TX electrodes and a plurality of RX electrodes intersecting with each other are disposed, comprising:
    a driving circuit to drive the plurality of TX electrodes and the plurality of RX electrodes such that a response signal is received from an electrode to which a driving signal has been supplied;
    a controlling circuit to control the driving circuit such that two adjacent TX electrodes or two adjacent RX electrodes are driven respectively in different times; and
    a transmitting circuit to transmit touch data generated according to the response signal to an external device,
    wherein the driving circuit receives a response signal from an electrode to which a driving signal has been supplied in a self-capacitive mode, whereas the driving circuit supplies a driving signal to a TX electrode from the plurality of TX electrodes and receives a response signal from an RX electrode from the plurality of RX electrodes in a mutual capacitive mode,
    wherein the controlling circuit selectively controls the driving circuit to operate in one of the self-capacitive mode or the mutual capacitive mode,
    wherein the controlling circuit controls the driving circuit to drive the two adjacent TX electrodes from the plurality of TX electrodes or the two adjacent RX electrodes from the plurality of RX electrodes in different times in the self-capacitive mode and controls the driving circuit to simultaneously drive the two adjacent TX electrodes in the mutual capacitive mode.

2. The touch sensing device of claim 1, wherein the controlling circuit drives TX electrodes from the plurality of TX electrodes or RX electrodes from the plurality of RX electrodes disposed in odd-numbered positions in one direction in a first time and drives TX electrodes from the plurality of TX electrodes or RX electrodes from the plurality of RX electrodes disposed in even-numbered positions in the one direction in a second time different from the first time.

3. The touch sensing device of claim 1, wherein the controlling circuit divides the plurality of TX electrodes or the plurality of RX electrodes into N (N is a natural number, which is 2 or higher) groups and drives the N groups in different times and each N group comprises TX electrodes or RX electrodes having a same remainder after dividing sequence numbers of the TX electrodes or RX electrodes disposed in one direction by N.

4. The touch sensing device of claim 1, wherein the controlling circuit controls the driving circuit to drive the plurality of TX electrodes and the plurality of RX electrodes in different times.

5. The touch sensing device of claim 1, wherein the driving circuit drives the plurality of RX electrodes using a plurality of channels respectively corresponding to the plurality of RX electrodes, wherein two adjacent channels respectively drive the plurality of RX electrodes in different times, and remaining channels, which do not drive the plurality of RX electrodes, operate in a power saving mode.

6. The touch sensing device of claim 1, wherein the controlling circuit controls the driving circuit to simultaneously drive multiple non-adjacent TX electrodes from the plurality of TX electrodes or multiple non-adjacent RX electrodes from the plurality of RX electrodes.

7. A touch sensing method, which is a method of sensing a touch to a panel in which a plurality of TX electrodes and a plurality of RX electrodes intersecting with each other are disposed, comprising:
    driving the plurality of TX electrodes such that a response signal is received from an electrode, to which a driving signal has been supplied, in a first time section of a self-capacitive mode, wherein two adjacent TX electrodes from the plurality of TX electrodes are respectively driven in different times;
    transmitting touch data generated according to the response signal to an external device, and
    simultaneously driving multiple adjacent TX electrodes from the plurality of TX electrodes in a mutual capacitive mode.

8. The touch sensing method of claim 7, further comprising:
    driving the RX electrodes from the plurality of RX electrodes such that a response signal is received from an electrode, to which a driving signal has been supplied, in a second time section of the self-capacitive mode, wherein adjacent two RX electrodes from the plurality of RX electrodes are respectively driven in different times.

9. The touch sensing method of claim 8, further comprising:
    determining a touch coordinate in one direction using a response signal for an RX electrode from the plurality of RX electrodes and a touch coordinate in another direction, perpendicular to the one direction, using a response signal for a TX electrode from the plurality of TX electrodes,
    wherein the touch data comprises the touch coordinate in the one direction and the touch coordinate in the other direction.

10. The touch sensing method of claim 7, further comprising:
    supplying a driving signal to a TX electrode from the plurality of TX electrodes and receiving a response signal from an RX electrode from the plurality of RX electrodes in a mutual capacitive mode after the driving in the self-capacitive mode.

11. The touch sensing method of claim 7, wherein multiple non-adjacent TX electrodes from the plurality of TX electrodes are simultaneously driven in the self-capacitive mode.

* * * * *